(12) United States Patent
Uehara

(10) Patent No.: US 8,672,346 B2
(45) Date of Patent: Mar. 18, 2014

(54) AIRBAG DEVICE

(71) Applicant: Masakatsu Uehara, Tokyo (JP)

(72) Inventor: Masakatsu Uehara, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/664,166

(22) Filed: Oct. 30, 2012

(65) Prior Publication Data

US 2013/0106082 A1   May 2, 2013

(30) Foreign Application Priority Data

Oct. 31, 2011   (JP) .................................. 2011-238423

(51) Int. Cl.
*B60R 21/203* (2006.01)

(52) U.S. Cl.
USPC ...................... 280/731; 280/728.2; 200/61.55

(58) Field of Classification Search
CPC .................................................. B60R 21/2037
USPC ................. 280/728.2, 731; 200/61.54, 61.55, 200/61.56, 61.57
See application file for complete search history.

(56) References Cited

U.S. PATENT DOCUMENTS

| | | | | |
|---|---|---|---|---|
| 4,785,144 A * | 11/1988 | Fosnaugh et al. | .......... | 200/61.55 |
| 5,303,952 A * | 4/1994 | Shermetaro et al. | .......... | 280/731 |
| 5,593,177 A * | 1/1997 | Ricks | ............................. | 280/731 |
| 5,801,349 A * | 9/1998 | Komiya et al. | ............ | 200/61.55 |
| 5,931,492 A * | 8/1999 | Mueller et al. | ............. | 280/728.2 |
| 6,860,509 B2 * | 3/2005 | Xu et al. | ........................ | 280/731 |
| 7,232,966 B2 * | 6/2007 | Burgard et al. | ............ | 200/61.55 |
| 7,566,071 B2 | 7/2009 | Tsujimoto et al. | | |
| 8,256,797 B2 * | 9/2012 | Sakurai et al. | ................ | 280/731 |
| 2002/0125698 A1 * | 9/2002 | Schutz | ........................... | 280/731 |
| 2006/0175816 A1 * | 8/2006 | Spencer et al. | ............... | 280/731 |
| 2006/0197323 A1 * | 9/2006 | Pillsbury et al. | ............. | 280/731 |
| 2006/0208470 A1 | 9/2006 | Tsujimoto et al. | | |
| 2008/0012270 A1 * | 1/2008 | Weigand et al. | ........... | 280/728.2 |
| 2010/0224465 A1 * | 9/2010 | Hayashi et al. | ............ | 200/61.57 |

FOREIGN PATENT DOCUMENTS

JP   2007050876   3/2007

* cited by examiner

*Primary Examiner* — James English
(74) *Attorney, Agent, or Firm* — Fitch, Even, Tabin & Flannery, LLP

(57) ABSTRACT

An airbag device includes an airbag, an inflator and a plurality of contact projections for horn switch which are held by a retainer, such that switching operation can be performed with respect to a steering wheel. When the contact projections for the horn switch are brought into contact with contact receiving portions of the steering wheel in response to a tilt operation according to a press by a driver, the horn are blown. Horn switch contacts are respectively provided in a plurality of contact members so as to be spaced from each other in a predetermined configuration, and each contact member is electrically connected to each other via the inflator.

4 Claims, 5 Drawing Sheets

AIRBAG DEVICE

CROSS-REFERENCE TO RELATED APPLICATION

This application is based on and claims priority under 35 USC §119 from Japanese Patent Application No. 2011-238423 filed Oct. 31, 2011.

FIELD OF THE INVENTION

The present invention relates to an airbag device which is provided in a steering wheel of a vehicle.

BACKGROUND OF THE INVENTION

Among airbag devices are ones for drivers which serve to confine a driver by an airbag that is expanded and developed from a steering wheel. And an airbag device for a driver is known which is equipped with horn switch contacts and serves as part of a horn switch mechanism for blowing a horn (refer to JP-A-2007-050876, for example).

In the above conventional airbag device, an airbag and an inflator are held by a retainer. A contact member (contact plate) is attached to the retainer. The contact plate is shaped like a bus bar and attached to the back surface of the retainer (i.e., the surface opposed to a steering wheel). Plural (e.g., three) horn switch contacts are arranged on the contact plate in a prescribed manner.

This airbag device is housed in a steering wheel in such a manner as to make a prescribed operation such as an advance/retreat or a tilt in response to a press operation of the driver. When the airbag device has made such a prescribed operation, a horn switch contact comes into contact with a contact receiving portion which is provided in the steering wheel, whereupon the horn switch is closed and the horn is blown.

SUMMARY OF THE INVENTION

The invention is an airbag device provided in a steering wheel of a vehicle. The airbag includes an airbag, an inflator, a retainer, a plural of contact members and a plural of horn switch contacts. The inflator supplies expansion and development gas to the airbag. The retainer holds the airbag and the inflator. The plural of contact members are provided on the retainer so as to be spaced from each other in a predetermined configuration. The plural of horn switch contacts are respectively provided in the plural of contact members so as to be arranged in a predetermined configuration and blow a horn when each horn switch contact is brought into contact with a corresponding one of a plural of contact receiving portions provided in the steering wheel. The plural of contact members are electrically connected to each other via a metal member held by the retainer.

In the airbag device, the metal member includes the retainer.

The airbag device further includes a harness connector. The harness connector is provided on the metal member or one of the plural of contact members. The metal member or the one contact member is connected to a wire harness via the harness connector.

DETAILED DESCRIPTION OF THE PREFERRED EMBODIMENTS

Figure 1:
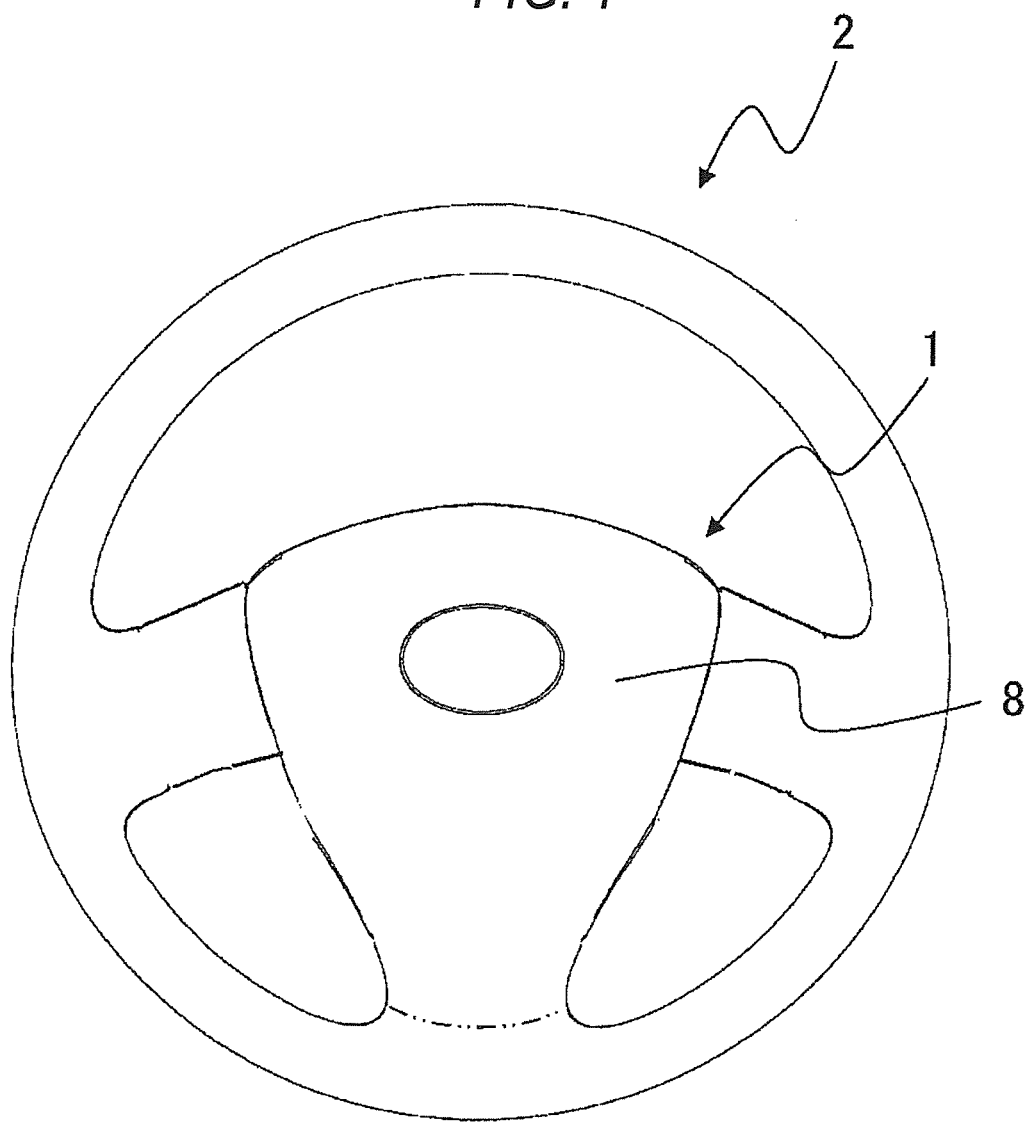
FIG. 1 is a front view of a steering wheel which contains an airbag device according to a first embodiment of the present invention.
Figure 2:
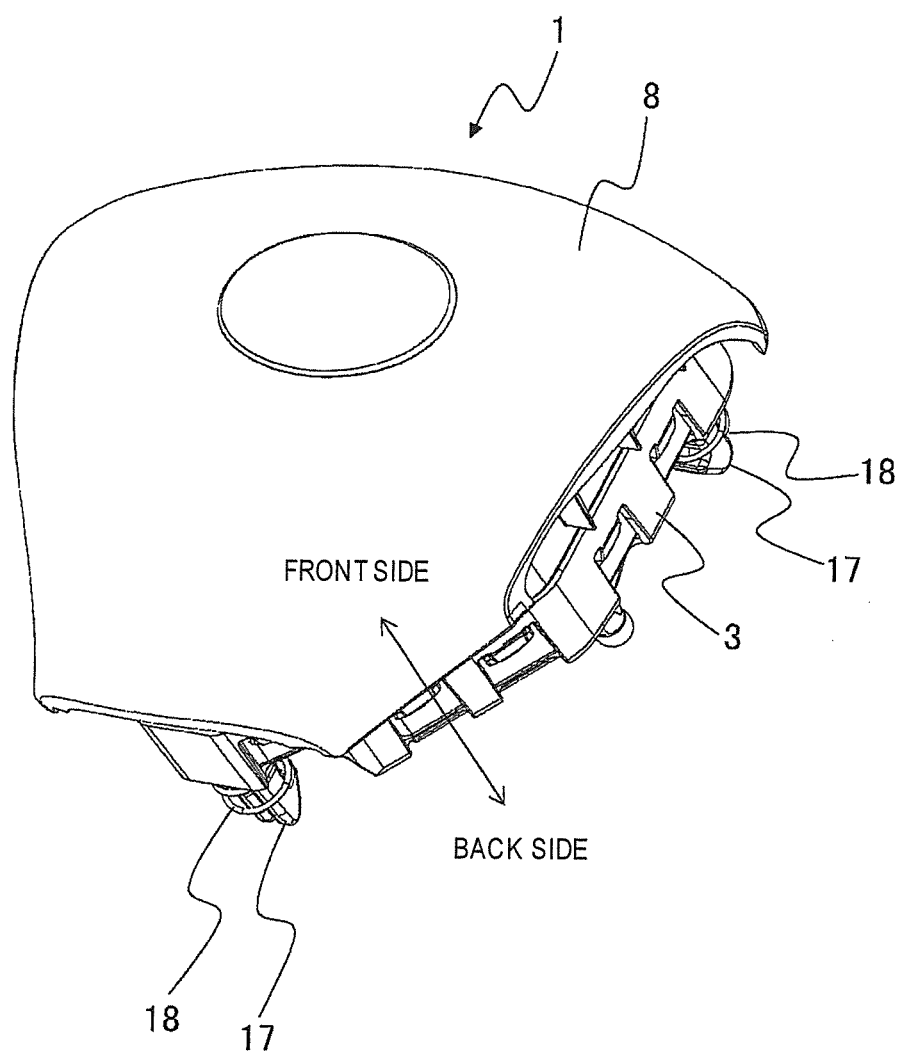
FIG. 2 is a front perspective view of the airbag device of FIG. 1.
Figure 3:
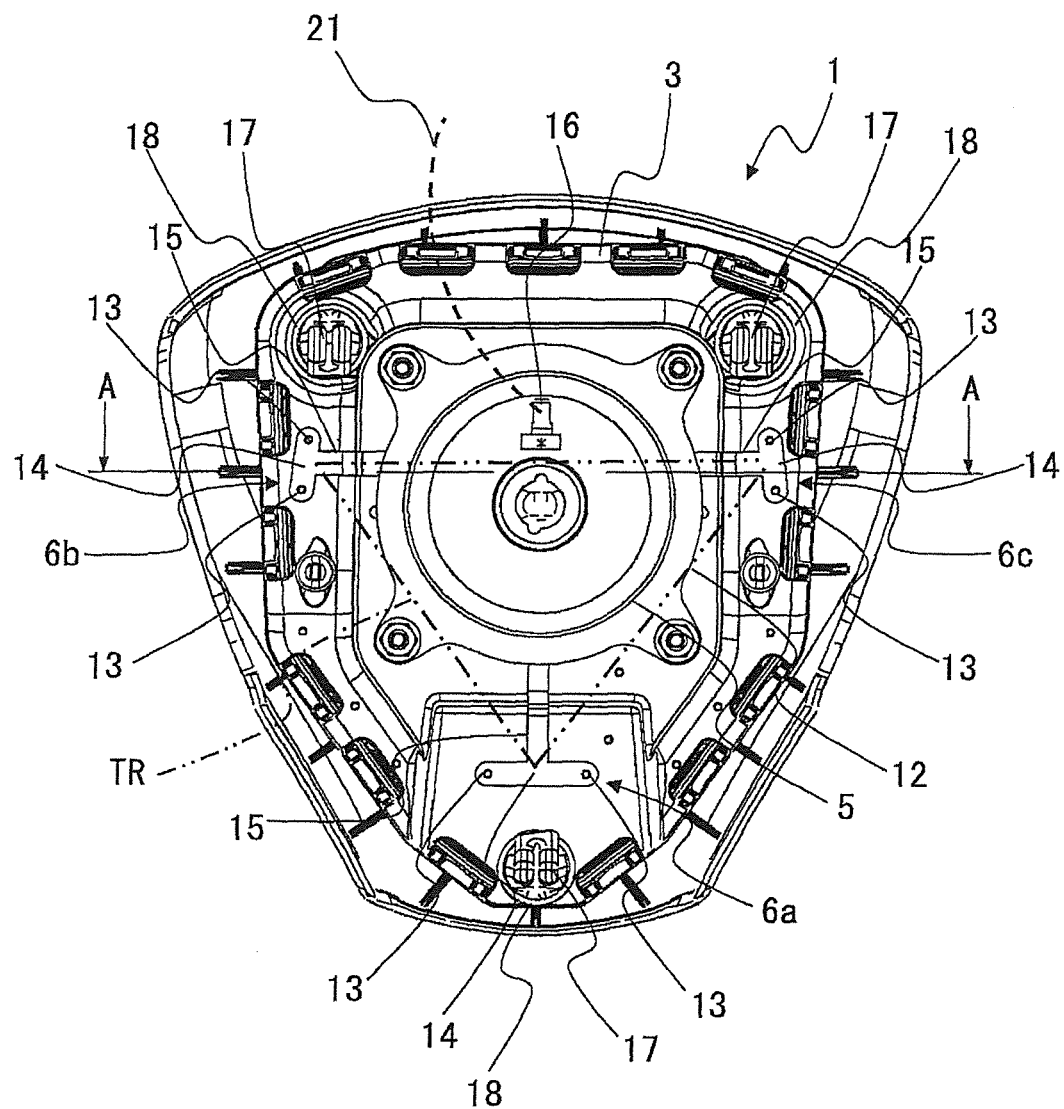
FIG. 3 is a rear view of the airbag device of FIG. 1.
Figure 4:
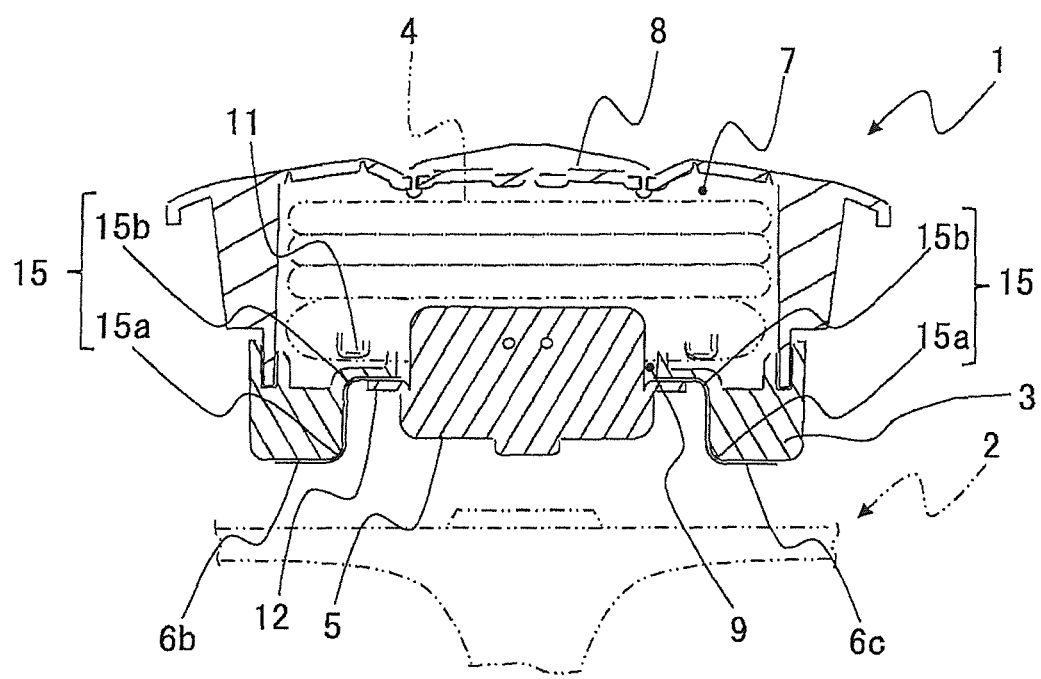
FIG. 4 is a sectional view taken along line A-A in FIG. 3.

An airbag device 1 for a steering wheel according to a first embodiment of the present invention will be hereinafter described with reference to FIGS. 1-4. FIG. 1 is a front view of a steering wheel 2 which contains the airbag device 1. FIG. 2 is a front perspective view of the airbag device 1. In the following, individual components will be described with definitions that the top-left side and the bottom-right side in FIG. 2 are the front side and the back side, respectively. FIG. 3 is a rear view of the airbag device 1. FIG. 4 is a sectional view taken along line A-A in FIG. 3. FIG. 4 also shows, schematically, an important part of the steering wheel 2 which contains the airbag device 1.

As shown in FIGS. 1-4, the airbag device 1 is equipped with a retainer 3, an airbag 4 which is housed in the retainer 3, an inflator 5, for generating gas for expanding and developing the airbag 4, and plural (in this example, three) contact members 6a-6c.

The retainer 3 is made of a synthetic resin, is shaped, as a whole, like a short cylinder having a generally trapezoidal horizontal cross section, and has a housing space 7 inside. A retainer cover 8 is attached to the front portion of the retainer 3 so as to close the front opening of the retainer 3. On the other hand, a holding opening 9 is formed through a rear wall of the retainer 3 at the center in the radial direction, that is, it is formed adjacent to a proximal portion of the housing space 7.

The airbag 4 and the inflator 5 are housed in and held by the retainer 3 in the following manner. The airbag 4 has an inflator insertion mouth, and is placed in the housing space 7 in such a folded state that the inflator insertion mouth is adjacent to the proximal portion of the housing space 7. A portion of the inflator 5, which is held by the retainer 3 in a manner described later, is inserted in the inflator insertion mouth of the airbag 4, and a circumferential end portion of the inflator insertion mouth is fixed to a circumferential end portion, around the holding opening 9, of the retainer 3 by a fixing member 11 by pressing. The airbag 4 which is housed in and held by the retainer 3 in this manner is expanded and developed when it is activated and the retainer cover 8 is cloven. On the other hand, the inflator 5 has a flange 12.

And the inflator 5 is held by the retainer 3 in such a manner as to be fixed to the circumferential end portion, around the holding opening 9, of the retainer 3 with bolts with the flange 12 sandwiched in between in a state that the inflator 5 is fitted in the holding opening 9. Alternatively, the inflator 5 may be attached to the front side of the retainer 3 together with the airbag 4.

The contact members 6a-6c are provided with respective horn switch contacts 14 for a horn switch mechanism. In this embodiment, the horn switch contacts 14 of the contact members 6a-6c are arranged at the three apices of an isosceles triangle (indicated by an imaginary line TR in FIG. 3). Each horn switch contact 14 is attached to the retainer 3 via welding projections 13. The horn (not shown) can be blown when one of the horn switch contact 14 is brought into contact with a fixed contact (not shown) provided as a contact receiving portion in the steering wheel 2 and thereby attains electrical continuity there. Each of the contact members 6a-6c is composed of the horn switch contact 14 and a connection bar 15 which intersects it and is generally T-shaped in a plan view (see FIG. 3). The number of contact members is not limited to three and may be more than three. For example, where four contact members are provided, the horn switch contacts 14 may be arranged at the four apices of a quadrangle (including a square and a trapezoid) so as to be able to come into contact with four respective fixed contacts which are provided at corresponding positions in the steering wheel 2.

The contact members 6a-6c (hereinafter may be referred to generically as contact members 6) are attached to the back surface of the retainer 3 in such a manner that the horn switch contacts 14 are located outside. As described above, the contact members 6a-6c are arranged around the inflator 5 in such a manner that their horn switch contacts 14 are arranged at the apices of an isosceles triangle. As a result, the contact members 6a-6c are spaced from each other.

To equalize the contact functions of the horn switch contacts 14, it is necessary that the contact members 6a-6c which are spaced from each other as mentioned above be integrated together electrically. To this end, a metal member held by the retainer 3 is used. In this embodiment, the inflator 5 is used as this metal member, that is, the contact members 6a-6c are electrically connected to each other via the inflator 5.

More specifically, as shown in FIG. 4, tip portions of the connection bars 15 are sandwiched between the flange 12 of the inflator 5 and the circumferential end portion, around the holding opening 9, of the retainer 3. As a result, the connection bars 15 are rendered in strong contact with the flange 12 of the inflator 5 and connected to the inflator 5 electrically. The connection bars 15 are bent so as to conform to the projection/recess structure of the back surface of the retainer 3. More specifically, each connection bar 15 has a bent structure consisting of a first bent portion 15a and a second bent portion 15b which are bent a hook-like manner in opposite directions.

To allow the contact members 6a-6c to exercise their contact functions, the contact members 6a-6c which are electrically connected to each other via the inflator 5 need to be connected to a power line (or a ground line). To this end, in the embodiment, the inflator 5 is equipped with a harness connector 16 and a wire harness 21 (indicated by a broken line) is connected to the inflator 5 via the harness connector 16. That is, the contact members 6a-6c are connected to the wire harness 21 via the inflator 5.

The airbag device 1 having the above configuration is attached to the steering wheel 2 via attachment legs 17 and coil springs 18 which are provided on the back surface of the retainer 3. The attachment legs 17 are erected outward from the back surface of the retainer 3 and are arranged at three positions corresponding to the respective apices of the isosceles triangle of the horn switch contacts 14. The attachment legs 17 are inserted through insertion holes (not shown) formed in the steering wheel 2 and locked on the steering wheel 2 when the airbag device 1 is attached to the steering wheel 2. As a result, the airbag device 1 is attached to the steering wheel 2 while being allowed to make such an operation as an advance/retreat or a tilt with respect to the steering wheel 2.

The coil springs 18 are provided so as to surround the respective attachment legs 17. The coil springs 18 urge the airbag device 1 in such a direction that it goes away from the steering wheel 2 in the above-described state that the airbag device 1 is attached to the steering wheel 2 while being allowed to make such an operation as an advance/retreat or a tilt. That is, since the airbag device 1 is urged by the coil springs 18 in such a direction as to go away from the steering wheel 2, the horn switch contacts 14 are prevented from contacting the fixed contacts except when the driver pushes the airbag device 1 to blow the horn.

As described above, in the airbag device 1 according to embodiment, the horn switch contacts 14 are provided for the respective contact members 6. As a result, each contact member 6 can be given a simple shape that enables a high material yield. Furthermore, the size of each contact member 6 can be made small, which makes it possible to increase the material yield in forming plural contact members 6 by, for example, punching a metal plate. In particular, in the embodiment, each contact member 6 is composed of the horn switch contact 14 and the connection bar 15 and generally T-shaped in a plan view. With such a simple shape, the contact members 6 can make the material yield in forming them by punching, for example, much higher than in, for example, the above-described conventional technique (JP-A-2007-50876) which uses the generally U-shaped contact member which surrounds the inflator. This leads to further cost reduction.

The plural separate contact members 6 can be integrated electrically by electrically connecting them utilizing the fact that the inflator 5 which is provided in the retainer 3 is conductive. This makes it possible to lower the cost more certainly than in a case that individual contact members are integrated electrically by connecting a wire harness to each contact member.

Figure 5:
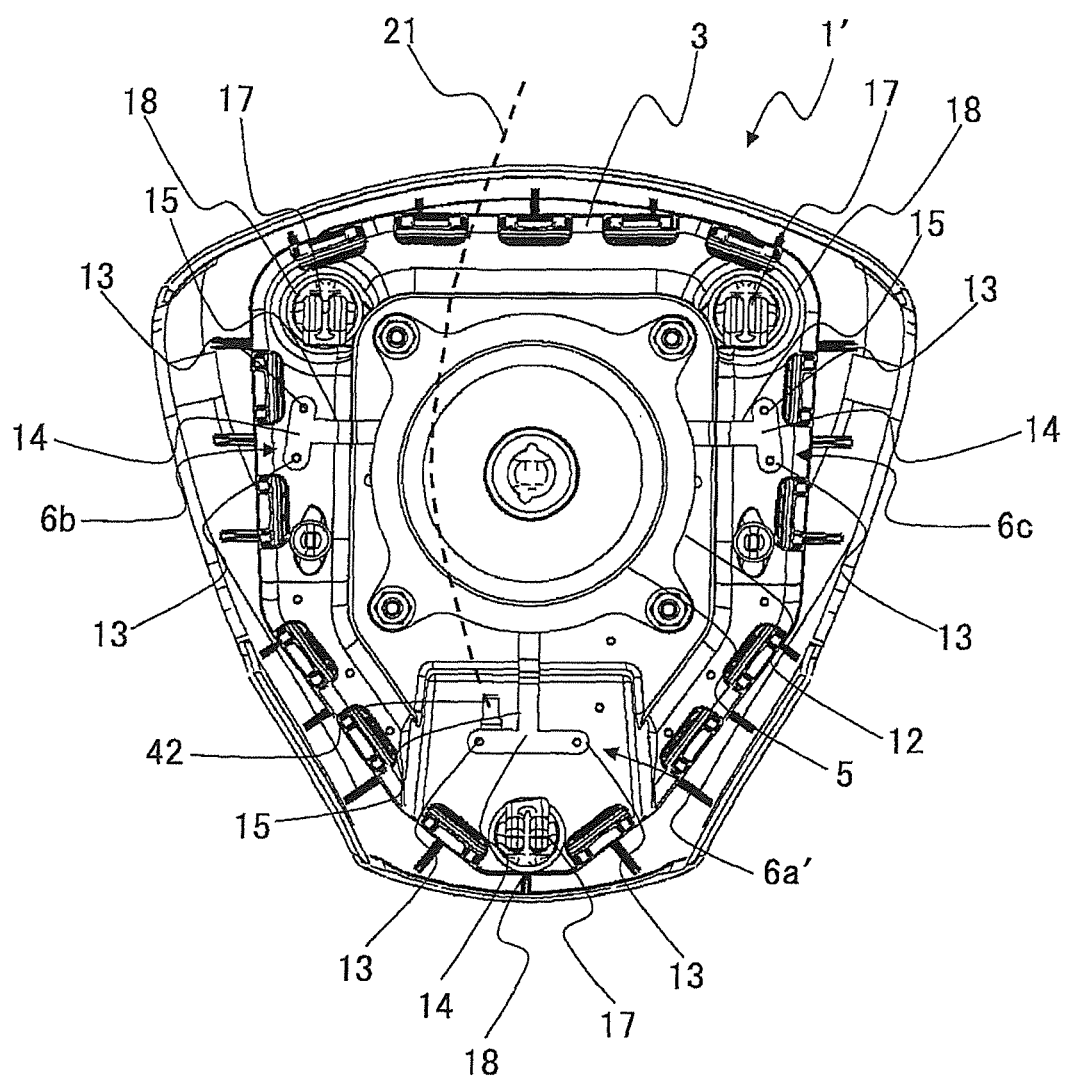
FIG. 5 is a rear view of an airbag device according to a second embodiment of the invention.

FIG. 5 shows the configuration of an airbag device 1' according to a second embodiment of the invention. Like FIG. 3 which relates to the first embodiment, FIG. 5 is a rear view of the airbag device 1'. Components having the same or corresponding ones in the first embodiment are given the same reference symbols as the latter and will not be described or will be described only in a simplified manner.

As shown in FIG. 5, like the airbag device 1 according to the first embodiment, the airbag device 1' according to the second embodiment is equipped with three contact members 6a', 6b, and 6c. However, the contact members 6a', 6b, and 6c are connected to the wire harness 21 differently than the contact members 6a, 6b, and 6c used in the first embodiment.

More specifically, a harness connector 42 is integral with the horn switch contact 14 of the contact member 6a' and the wire harness 21 is connected to the horn switch contacts 14 of the contact members 6a', 6b, and 6c via the harness connector 42. That is, whereas the horn switch contact 14 itself of the contact member 6a' is connected to the wire harness 21 via the harness connector 42, the horn switch contacts 14 of the contact members 6b and 6c are connected to the wire harness 21 via the inflator 5, the contact member 6a', and the harness connector 42. The airbag device 1' according to this embodiment has an advantage that the number of components is smaller than in the airbag device 1 according to the first embodiment. That is, the harness connector 16 which is necessary in the airbag 1 according to the first embodiment is not necessary in this embodiment, the number of components is reduced accordingly.

Although the embodiments of the invention have been described above, they are just typical examples and the invention can be practiced in various manners without departing from the spirit and scope of the invention. For example, although in the above embodiments the inflator 5 serves as the metal member via which electrical contact to each contact member is made, the invention is not limited to such a case. If another proper metal member is held by the retainer 3, it may be used for this purpose.

What is claimed is:

1. An airbag device provided in a steering wheel of a vehicle, comprising:
    an airbag;
    an inflator that supplies expansion and development gas to the airbag;
    a retainer that holds the airbag and the inflator; and
    a plurality of contact members that are provided on the retainer so as to be spaced from each other in a predetermined configuration and that includes a plurality of horn switch contacts and a plurality of connection bars which intersect the plurality of horn switch contacts respectively;
    wherein the plurality of horn switch contacts are arranged in a predetermined configuration and blow a horn when one of the plurality of horn switch contacts is brought into contact with a corresponding one of a plurality of contact receiving portions provided in the steering wheel,
    wherein each contact member is T-shaped in a rear view of the airbag device, and
    wherein the plurality of contact members are electrically connected to each other via a metal member held by the retainer.

2. The airbag device according to claim 1,
    wherein the metal member includes the inflator.

3. The airbag device according to claim 1, further comprising:
    a harness connector that is provided on the metal member or one of the plurality of contact members,
    wherein the metal member or the one contact member is connected to a wire harness via the harness connector.

4. The airbag device according to claim 2, further comprising:
    a harness connector that is provided on the metal member or one of the plurality of contact members,
    wherein the metal member or the one contact member is connected to a wire harness via the harness connector.

* * * * *